US011906129B1

(12) United States Patent
Kay

(10) Patent No.: US 11,906,129 B1
(45) Date of Patent: Feb. 20, 2024

(54) RECESSED CIRCULAR CHANNEL LIGHT SYSTEM

(71) Applicant: PureEdge Lighting LLC, Chicago, IL (US)

(72) Inventor: Gregory Kay, Chicago, IL (US)

(73) Assignee: PureEdge Lighting LLC, Chicago, IL (US)

( * ) Notice: Subject to any disclaimer, the term of this patent is extended or adjusted under 35 U.S.C. 154(b) by 0 days.

(21) Appl. No.: 17/823,121

(22) Filed: Aug. 30, 2022

Related U.S. Application Data

(63) Continuation-in-part of application No. 17/817,592, filed on Aug. 4, 2022, and a continuation-in-part of application No. 17/817,420, filed on Aug. 4, 2022.

(51) Int. Cl.
*F21S 8/02* (2006.01)
*F21V 21/04* (2006.01)
*F21Y 103/10* (2016.01)
*F21Y 115/10* (2016.01)

(52) U.S. Cl.
CPC ............ *F21S 8/026* (2013.01); *F21V 21/041* (2013.01); *F21Y 2103/10* (2016.08); *F21Y 2115/10* (2016.08)

(58) Field of Classification Search
CPC ..................................... F21S 8/02; F21S 4/28
See application file for complete search history.

(56) References Cited

U.S. PATENT DOCUMENTS

| | | | | |
|---|---|---|---|---|
| 10,190,738 | B1 * | 1/2019 | James | F21S 4/28 |
| 10,619,828 | B2 | 4/2020 | Tremaine | |
| 10,663,148 | B1 * | 5/2020 | Heredia | F21V 21/35 |
| D929,032 | S | 8/2021 | Trzesniowski | |
| 11,499,685 | B1 * | 11/2022 | Flynn | F21S 8/024 |
| 11,499,686 | B1 * | 11/2022 | Machlis | F21V 5/04 |
| 2009/0225546 | A1 | 9/2009 | Pearson | |
| 2014/0233229 | A1 * | 8/2014 | Yaphe | F21V 21/041 362/235 |
| 2016/0245488 | A1 * | 8/2016 | Clark | F21V 21/005 |
| 2016/0356470 | A1 | 12/2016 | Noh | |
| 2018/0320840 | A1 * | 11/2018 | Machlis | F21V 17/002 |
| 2020/0149716 | A1 | 5/2020 | Collado | |
| 2022/0107062 | A1 | 4/2022 | Monsonego | |

FOREIGN PATENT DOCUMENTS

WO 2021229082 A1 11/2021

* cited by examiner

*Primary Examiner* — Christopher E Dunay
(74) *Attorney, Agent, or Firm* — Bishop, Diehl & Lee, Ltd.

(57) ABSTRACT

A circular recessed channel lighting system having a closed-loop channel section with a U-shaped channel having two parallel sides, first and second flange elements, each flange element extending from an end of one of the parallel sides of the U-shaped channel, an LED positioned within the U-shaped channel, and a flexible lens positioned over an open end of the U-shaped channel to allow light from the LED outward. The flange elements include through holes for adhesion of a building material (e.g., joint compound) and the U-shaped channel has a depth not greater than ⅝ inches (0.625 inches).

5 Claims, 5 Drawing Sheets

RECESSED CIRCULAR CHANNEL LIGHT SYSTEM

RELATED APPLICATIONS

The present application is a continuation-in-part of and claims the filing priority of related U.S. patent application Ser. No. 17/817,420, and Ser. No. 17/817,592, each titled “Recessed Curved Channel Light System” and each being filed on Aug. 4, 2022. The ’420 application and the ’592 application are each hereby incorporated by reference.

TECHNICAL FIELD OF THE INVENTION

The present invention relates to lighting systems. More specifically, the invention relates to customizable circular recessed channel lighting systems.

BACKGROUND OF THE INVENTION

Lighting is an important feature when designing or creating a work environment or living space. It is not enough that the lighting provides sufficient illumination to an area. Lighting and lighting fixtures have an aesthetic function as well. When done properly, lighting can be dynamic and flow as a user moves within the space. A commonly used permanent lighting design is recessed lighting where fixtures are recessed within a surface. The most popular recessed lights are singular round focused lights, known as can lights, which are often used in a ceiling surface to highlight a specific area. However, recessed channel lighting can also be used in ceilings and walls.

Recessed channel lights are different than track lighting in that they are installed, for example, into a hollow opening—usually a continuous channel—in a ceiling or wall surface (i.e., wall board). When installed properly, it appears that light is shining from the channel in the surface. The effect is accomplished because, unlike track lighting, little if any of the actual recessed lighting fixture is observable.

However, recessed lights are fixed light sources which cannot be readily moved without some skilled electrical re-wiring and surface patching. As a result, recessed lighting is often used as an accent to highlight another feature of a space. Another drawback of recessed lighting is that it requires either the lights be positioned between joists, or joists must be notched or altered in some way to accommodate the recessed fixture if it extends across joists. The cutting of ceiling or wall joists is time-consuming and, in many cases, an undesirable option.

Further, recessed lighting tends to have a “static” appearance, being comprised of circles (i.e., can light) and straight lines. This can limit both creativity and, as a result, the aesthetics of recessed lighting.

The present invention provides a lighting system without the aesthetic drawbacks of prior lighting systems and without the lighting and installation limitations of standard recessed lights. By providing a customizable circular lighting system, aesthetics are significantly improved. The present lighting system can be installed without exposure of unsightly brackets and tracks and without the need to notch or otherwise alter existing studs or joists.

Until the invention of the present application, these and other problems in the prior art went either unnoticed or unsolved by those skilled in the art. The present invention provides a recessed channel lighting system which is capable of multiple configurations with the associated light fixtures without sacrificing design, style or affordability.

SUMMARY OF THE INVENTION

There is disclosed herein an improved recessed channel lighting system which avoids the disadvantages of prior devices, methods and systems while affording additional structural and operating advantages.

Generally speaking, the recessed lighting system comprises a circular body, an LED strip, and a flexible lens. Preferably, the circular body is a closed-loop comprised of a U-shaped channel for housing the LED strip, and opposing first and second flange elements extending outward from the channel.

In specific embodiments of the recessed lighting system, the channel has a depth not greater than ⅝ inches (0.625 inches). This allows flush placement in standard drywall without the need for notching studs.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
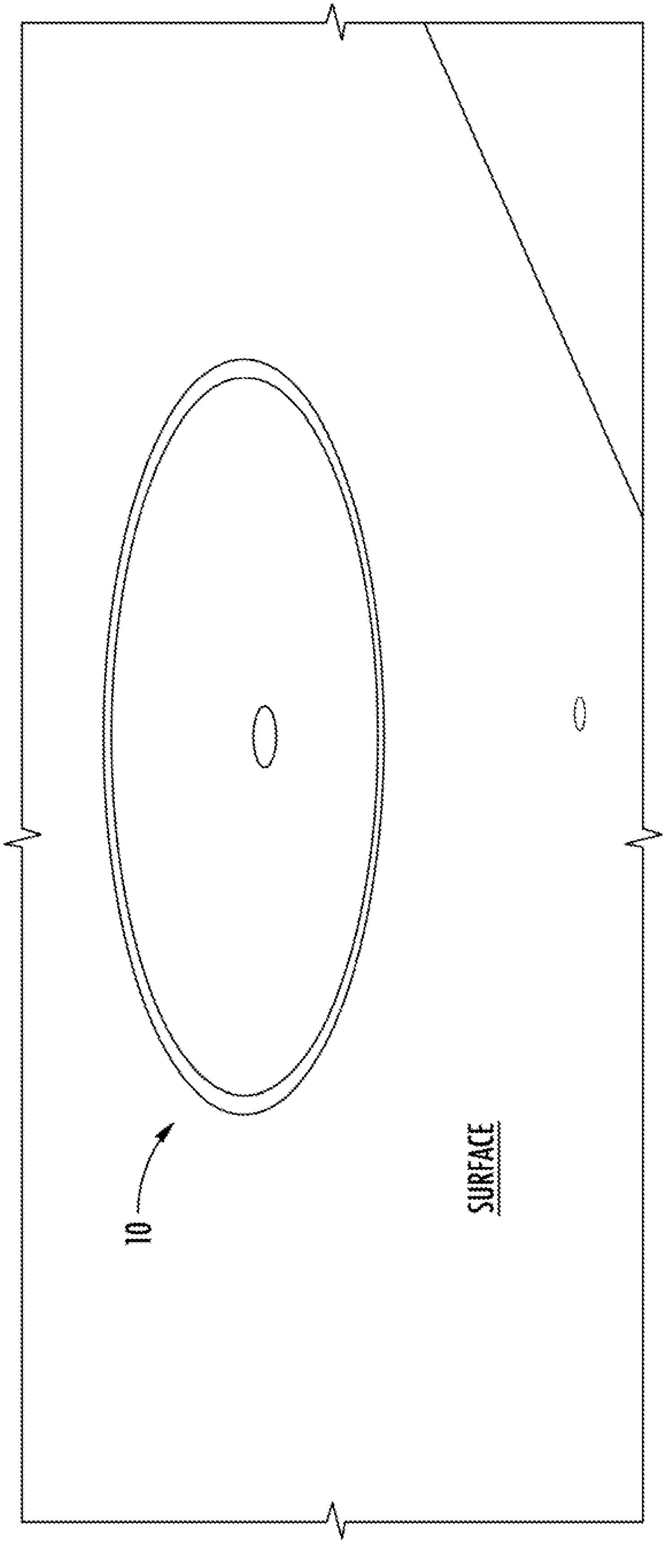
FIG. 1 is a perspective view of an embodiment of the disclosed circular recessed channel lighting system installed within a ceiling surface.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-4, there is illustrated at least one embodiment of a circular recessed channel lighting system, generally designated by the numeral 10. The particular illustrated channel lighting system 10 is for installation into a ceiling or wall surface. However, while all the embodiments illustrated are directed to installation within a ceiling or wall, it should be understood that the principles of the invention can be more broadly applied to installation on a surface of any type, as long as there is sufficient depth for the system to be recessed.

Beginning with FIG. 1, the channel lighting system 10 is shown installed in a ceiling surface encircling a can light. The illustrated system 10 is comprised of an extruded U-shaped channel 12 forming a closed loop, an LED strip 14 positioned within the channel 12, and a flexible lens 16 covering the open end of the channel 12. The system 10 can be manufactured to almost any diameter size, but preferable diameters are in the range of about 1 to 24 feet (±5%). Most preferably, the diameter of the system is in the range of about 2 to 18 feet (±5%). As will be described and illustrated, the lighting system 10 is designed to cross wall and ceiling studs without requiring notching.

Figure 2A:
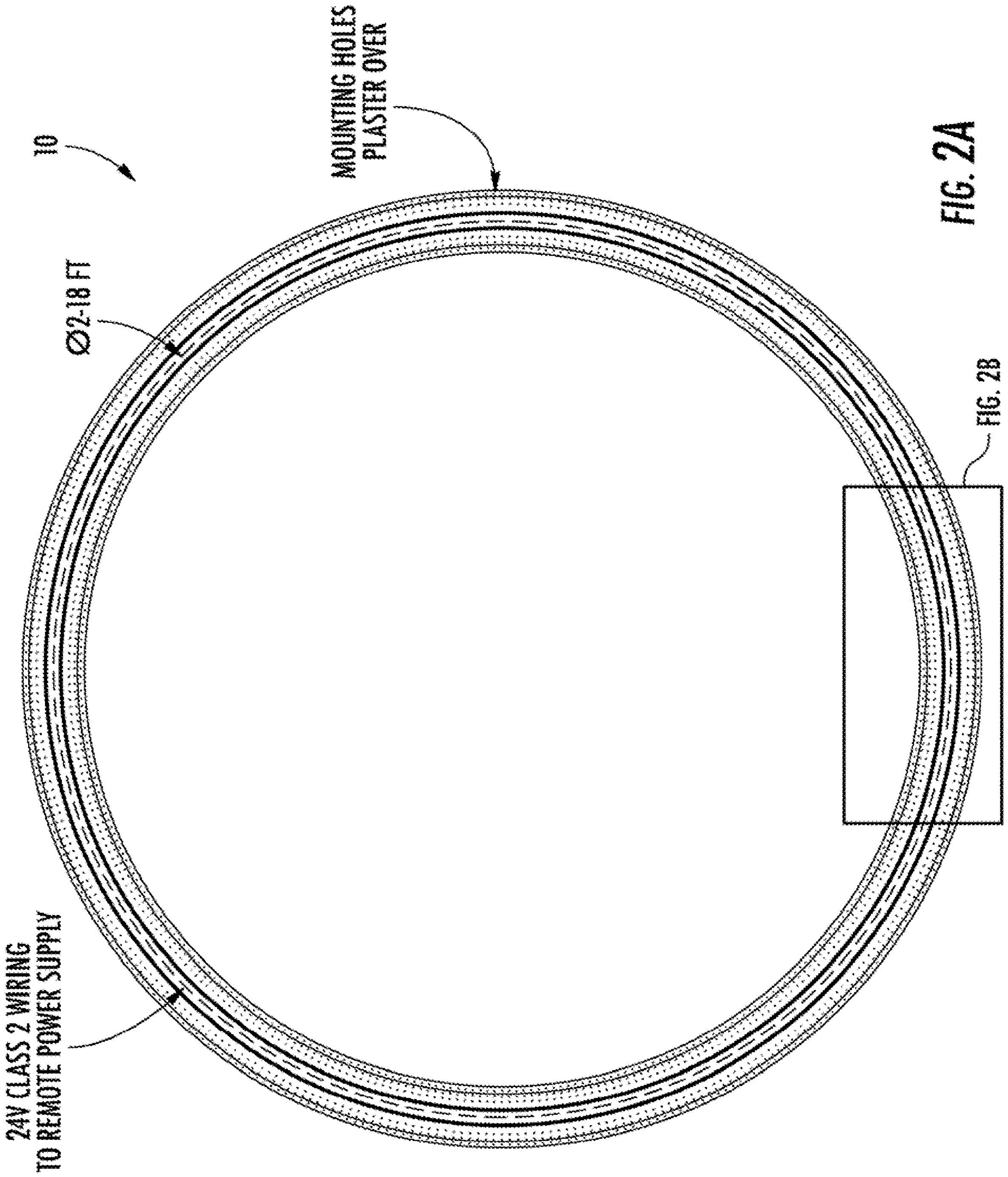
FIG. 2A is a top view of an embodiment of the disclosed circular recessed channel lighting system prior to installation.
Figure 2B:
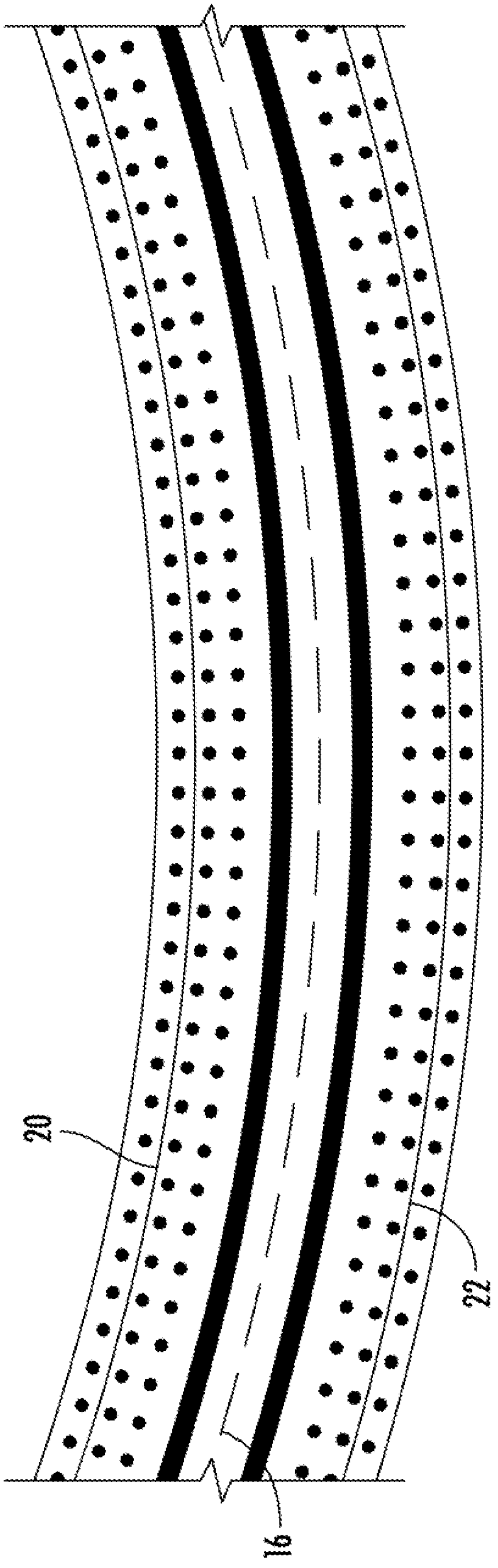
FIG. 2B is a close-up of a section of the circular recessed channel lighting system shown in FIG. 2A.

As shown in FIGS. 2A and 2B, the system 10 includes opposing flanges 20, 22, extending outward from ends of the sides of the U-shaped channel 12. The flanges 20, 22 are preferably perforated to facilitate application and adherence of a joint compound or similar building material after installation, as detailed below. Additional holes in the flanges 20, 22 can be used to secure the channel 12 to the surface before application of the joint compound/building material.

Figure 3:
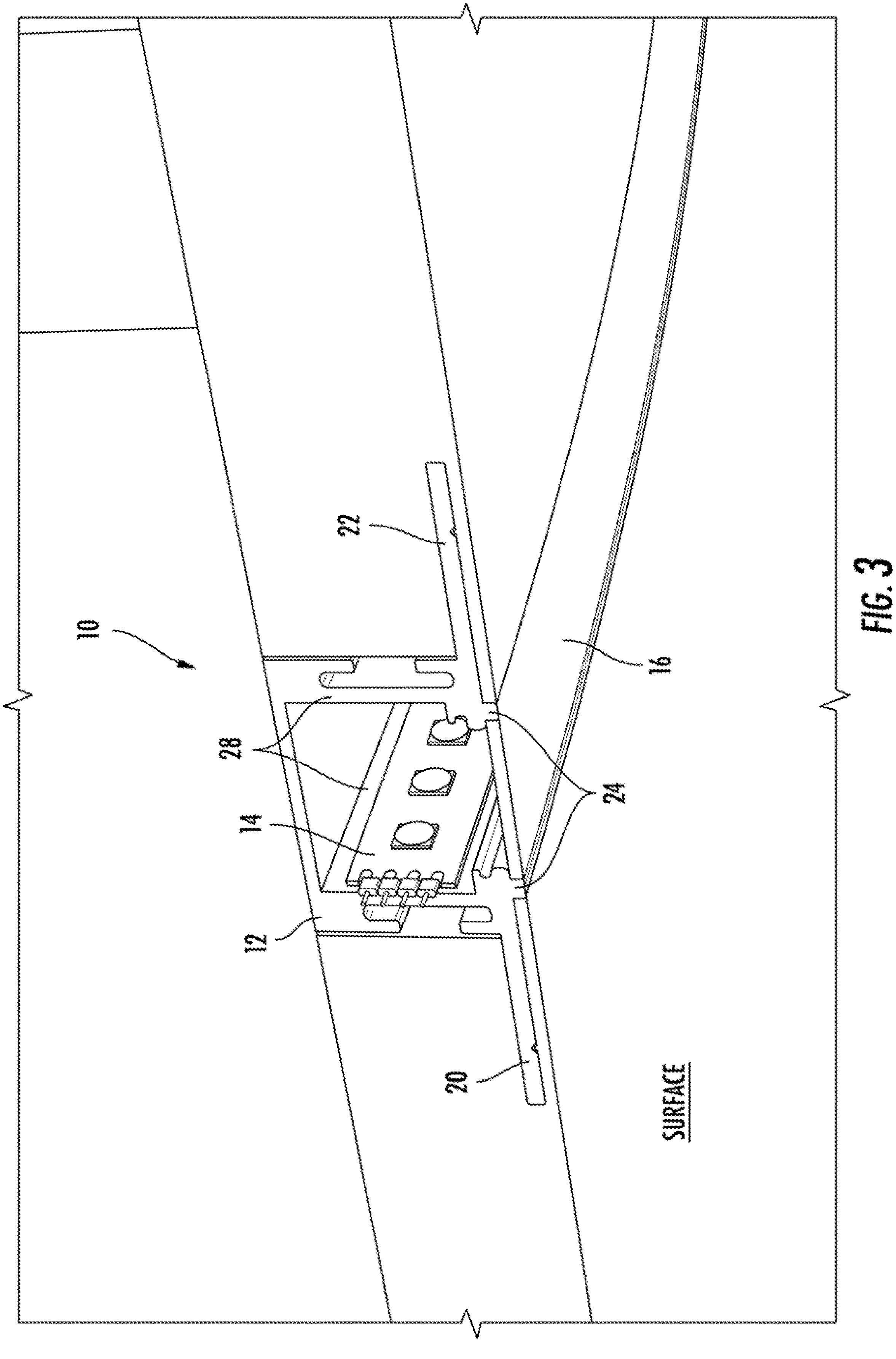
FIG. 3 is a cross-sectional view of a first size of the disclosed circular recessed channel lighting system installed within a surface.
Figure 4:
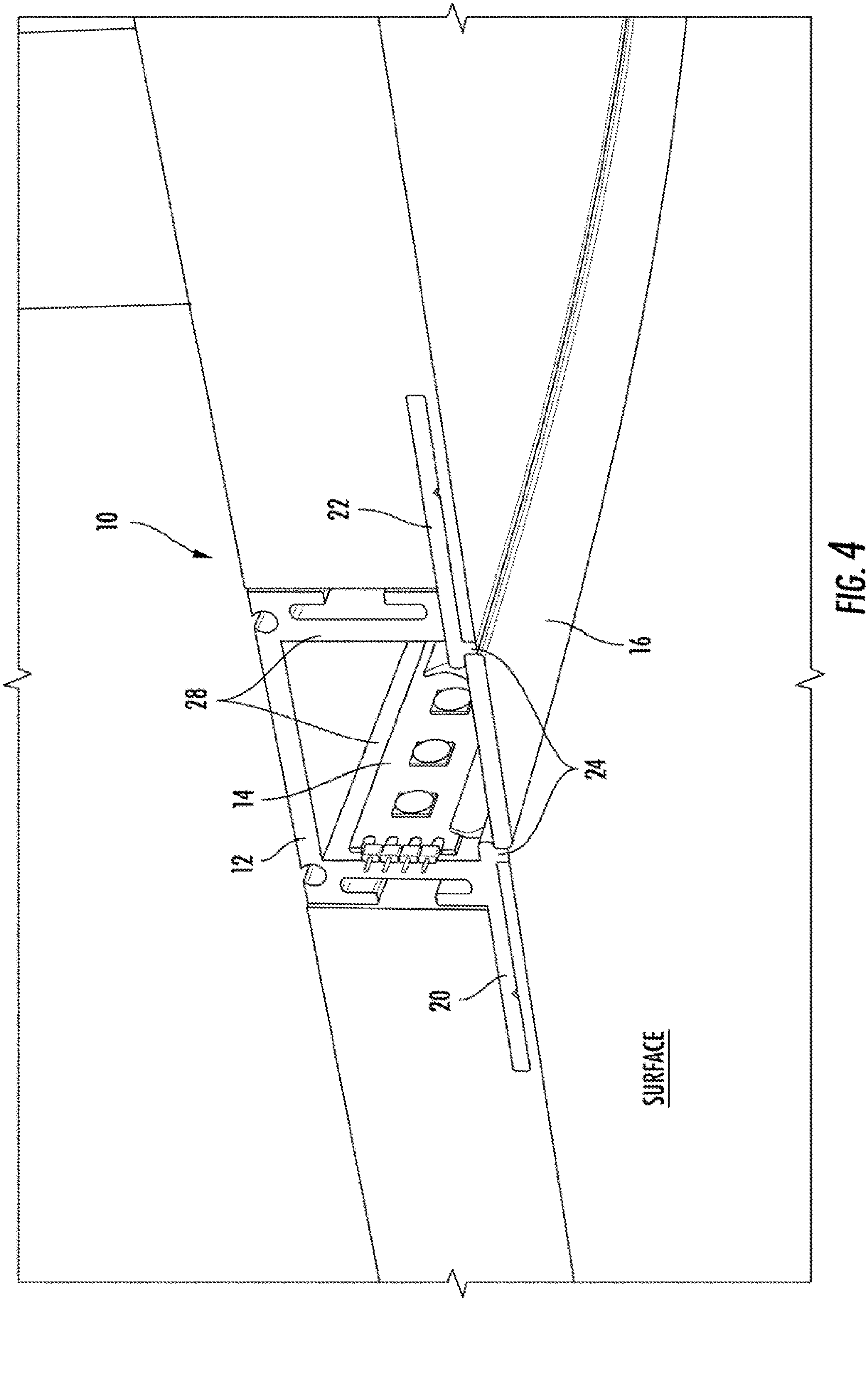
FIG. 4 is a cross-sectional view of a second size of the disclosed circular recessed channel lighting system installed within a surface.

FIGS. 3 and 4 show two different sizes for the U-shaped channel 12. The sidewalls 28 are the same, but the width of the two embodiments differ. While almost any width is possible for the system 10 for aesthetic purposes, preferably the width of channel 12 is in the range of about 0.25 inch to 2.0 inches (±5%), most preferably within the range of 0.5 inch to 1.0 inch (±5%). An LED strip 14 can be adhered to an interior surface of the channel wall 28. Preferably, LED strips 14 are placed along both interior surfaces of the channel walls 28 for maximum light.

The channel sidewalls 28 effectively isolate the channel 12, or more accurately the LED strip 14 within the channel 12. This isolation may be required by various ordinances and/or building codes. The flexible lens 16 is suited for the particular channel width, and easily slides onto the open end of the channel 12 between two side elements 24.

As illustrated in FIGS. 3 and 4, the profile of the channel 12, including the flanges 20, 22, is shallow enough to fit within ⅝-inch drywall (approx. 0.625 inches or 1.59 cm). This feature allows the system 10 to be placed in a typical wall or ceiling without having to notch studs or joists.

Regarding installation, a template is used to mark and cut an opening into a wall, ceiling or other surface for the system 10. The opening need only be wide enough to allow recess of the channel 12, while the left and right flanges 20, 22, contact the surface. Once inserted into the opening, the system 10 can be secured using mounting screws (not shown) through the flanges 20, 22 and into the surface. Power can be supplied to the lighting system 10 by running wires from the LED strip 14 to connect to a junction box, as is known in the art. The connection should allow 24 VDC power to be fed to the LED strip(s) 14 within the channel 12. The junction box can be mounted behind drywall using mounting bars, as is known in the art. The system 10 is powered by running low voltage 24 VDC wires from a remote power supply to the junction box for each installed recessed circular channel lighting system 10. An "on/off" switch or dimmer may be used to control power to the lighting system 10.

Once the recessed lighting system 10 is fully installed and secured, including placement of LED strips 14 within the channel 12, the flexible lens 16 can be positioned over the top of the channel 12 between side elements 24. An application of joint compound over the perforated flanges 20, 22, will best adhere to and conceal the flanges 20, 22, as a result of the numerous perforations or openings in each. Once the compound is properly set, a coat of paint can be applied to complete the project.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A recessed lighting system comprising:
- a closed-loop channel section configured to be recessed within a surface at a depth not greater than ⅝ inch (0.625 inch), the closed-loop channel section comprising:
  - a U-shaped channel having two parallel sides;
  - first and second flange elements, each flange element extending directly from an end of one of the parallel sides of the U-shaped channel and configured to abut and secure to a mounting surface;
- an LED positioned within the U-shaped channel; and
- a flexible lens positioned over an open end of the U-shaped channel to allow light from the LED outward.

2. The recessed lighting system of claim 1, wherein the first and second flange elements comprise through holes.

3. The recessed lighting system of claim 1, wherein the closed-loop channel section has a diameter in the range of from about 1.0 foot to 24 feet.

4. The recessed lighting system of claim 3, wherein the closed-loop channel section has a diameter in the range of from about 2.0 feet to 18 feet.

5. A method for creating a recessed lighting system comprising:
- creating a circular closed-loop lighting system having a U-shaped channel, flange elements extending directly from ends of sidewalls of the channel, and at least one LED strip within the channel, wherein the circular closed-loop lighting system has a diameter in the range of from about 2 feet to 18 feet;
- creating a circular channel opening in a supporting surface, wherein the channel opening has a diameter identical to the diameter of the circular closed-loop lighting system;
- placing the U-shaped channel of the lighting system within the channel opening of the surface such that the flange elements contact an outer face of the surface and the depth of the U-shaped channel within the channel opening is not more than ⅝ inch (0.625 inch);
- connecting the at least one LED strip to a power source; and
- concealing the flange elements against the outer face of the surface using a building material.

* * * * *